A. T. WOODWARD.
CARD CABINET.
No. 104,391.  Patented June 14, 1870.
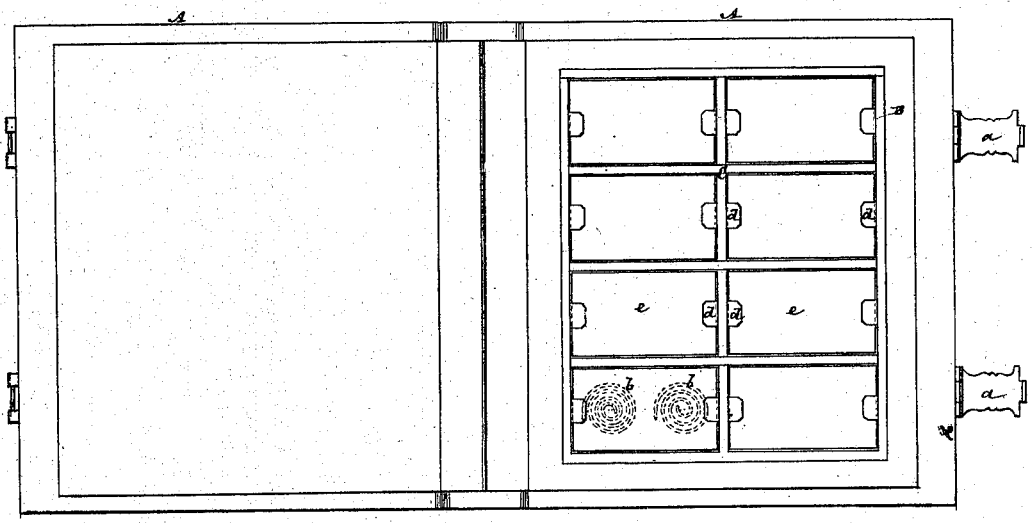
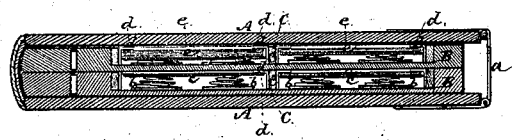
Witnesses:
Fred Haynes
R. F. Rabeau
Inventor:
A. T. Woodward

United States Patent Office.

ARTHUR T. WOODWARD, OF NEW YORK, N. Y.

Letters Patent No. 104,391, dated June 14, 1870.

IMPROVEMENT IN CARD-CABINETS.

The Schedule referred to in these Letters Patent and making part of the same

*To all whom it may concern:*

Be it known that I, ARTHUR T. WOODWARD, of the city, county, and State of New York, have invented a new and useful Distributing Card-rack Album, of which the following is a full, clear, and exact description, reference being had to the accompanying drawing forming part of this specification, and in which—

Figure 1 represents a face view of a distributing card-rack album as thrown open, and Figure 2 a transverse section of the same, closed.

Similar letters of reference indicate corresponding parts.

My invention consists in an arrangement of distributing card-racks within a book or album, and so that they form the leaves thereof, the same constituting a new and portable card-distributer, which, when closed, protects the cards from injury or dust, and which, by being placed to lie upon a table, in a hotel or other public place, is free to be taken up and examined, and is better calculated to enhance publicity by reason of its acceptability and attractiveness as an album, than are the open distributing card-racks heretofore in use, and hence the utility of the article, as an advertising and business medium, is proportionately increased.

Referring to the accompanying drawing—

A A are the halves or backs of the album, with any number of hollow leaves B B in them, and provided, if desired, with clasps $a$ $a$ for securing the album, when closed.

The leaves B B have arranged within them distributing card-racks C, fitted with springs $b$ $b$, and followers $c$ $c$, together with stops $d$ $d$ to the latter, for allowing of the insertion of the cards $e$, outward pressure of them toward the front of the rack, and ready extraction of the cards, as required.

What is here claimed, and desired to be secured by Letters Patent, is—

The album or book, having hollow leaves B B fitted with racks C, springs $b$ $b$, followers $c$ $c$, and stops $d$ $d$ to the latter, as shown and described, as a new article of manufacture.

A. T. WOODWARD.

Witnesses:
 FRED. HAYNES,
 HENRY PALMER.